S. BEDFORD.
Drawing-Knives.
No. 197,317.  Patented Nov. 20, 1877.
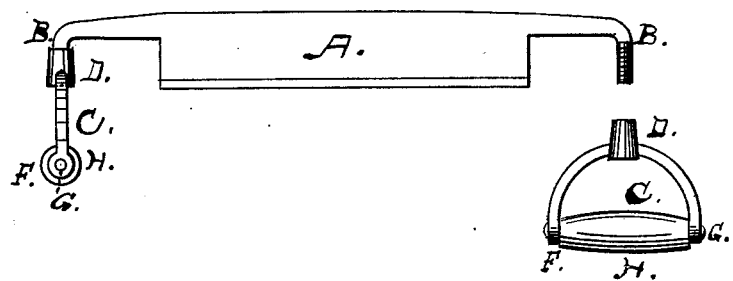
Witness
Horace Harris
Chas. Brodfield
Inventor
Simeon Bedford

UNITED STATES PATENT OFFICE.

SIMEON BEDFORD, OF NEWARK, NEW JERSEY.

IMPROVEMENT IN DRAWING-KNIVES.

Specification forming part of Letters Patent No. 197,317, dated November 20, 1877; application filed August 22, 1877.

*To all whom it may concern:*

Be it known that I, SIMEON BEDFORD, of Newark, in the county of Essex and State of New Jersey, have invented a new and useful Improvement in Drawing-Knife Handles, which improvement is fully set forth in the accompanying specification and drawings, in which, the figure is a plan view, with one of the handles detached and turned half over to illustrate this improvement.

The object of my invention is to provide the handle for a drawing-knife that shall stand at right angles, or nearly so, with the bent end of the shank, and at any angle in regard to the edge of the blade, so that the draft, in shaving, shall be directly across the base of the handle, rather than lengthwise of the handle.

The drawing-knife A is made in the ordinary manner, and the shank B is bent forward to receive the handle C. The shank has a screw-thread cut on it, and the handle has a threaded socket, D, so that it may be screwed onto the shank. This handle is made in shape like a stirrup, with the base F formed by connecting the two ends by means of a rod, G, covered with a wood roller, H.

Almost all of these parts may be varied, as that the handles may be made fast to the shank, and even the wood roll may be dispensed with, only so that the principle of invention be preserved—that of having the handles hung across the line of the shank B, instead of lengthwise with it; therefore,

What I claim as my invention, and desire to secure by Letters Patent, is—

The drawing-knife A, having the handles C so hung that the draft in use shall be across the line of the base F thereof, substantially as and for the purpose specified.

SIMEON BEDFORD.

Witnesses:
HORACE HARRIS,
CHAS. BRADFIELD.